United States Patent
Berlin et al.

(10) Patent No.: US 9,678,767 B2
(45) Date of Patent: Jun. 13, 2017

(54) UNIFIED EXTENSIBLE FIRMWARE INTERFACE (UEFI) DRIVER AND PROTOCOL

(71) Applicant: Hewlett-Packard Development Company, L.P., Houston, TX (US)

(72) Inventors: Kimon Berlin, Fort Collins, CO (US); Guilherme Antonio Anzilago Tesser, Porto Alegre (BR); Luis Fernando Pollo, Porto Alegre (BR); Charles Ricardo Staub, Porto Alegre (BR); Cristiano Fernandes, Porto Alegre (BR); Benito Silva, Porto Alegre (BR)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/787,990

(22) PCT Filed: Jun. 14, 2013

(86) PCT No.: PCT/US2013/045962
§ 371 (c)(1),
(2) Date: Oct. 29, 2015

(87) PCT Pub. No.: WO2014/200511
PCT Pub. Date: Dec. 18, 2014

(65) Prior Publication Data
US 2016/0103693 A1    Apr. 14, 2016

(51) Int. Cl.
*G06F 3/00* (2006.01)
*G06F 9/44* (2006.01)
(Continued)

(52) U.S. Cl.
CPC ........ *G06F 9/44521* (2013.01); *G06F 9/4401* (2013.01); *G06F 9/4411* (2013.01); *G06F 13/102* (2013.01)

(58) Field of Classification Search
None
See application file for complete search history.

(56) References Cited

U.S. PATENT DOCUMENTS

2009/0319806 A1* 12/2009 Smith ............... G06F 21/575
                                                      713/193
2010/0011197 A1   1/2010 Harmer
(Continued)

FOREIGN PATENT DOCUMENTS

KR    10-2013-0059089 A    6/2013

OTHER PUBLICATIONS

Aptio: Embedded UEFI Solutions for the Intel® Atom™ Processor. Nov. 14, 2012, pp. 1-2, American Megatrends, Inc., ami.com/support/doc/.

(Continued)

*Primary Examiner* — Craig Dorais
(74) *Attorney, Agent, or Firm* — HP Inc. Patent Department

(57) ABSTRACT

An example apparatus may comprise a processor and a memory device including computer program code. The memory device and the computer program code, with the processor, may cause the apparatus to execute a client application, the client application to consume a first protocol, the protocol having been produced by a Unified Extensible Firmware Interface (UEFI) wrapper driver; invoke, with the client application, the UEFI wrapper driver to perform at least one operation of the protocol; load a binary image of a worker application with the wrapper driver to invoke the at least one operation. The worker application calls at least one function of a software library to perform the at least one operation.

15 Claims, 3 Drawing Sheets

(51) Int. Cl.
*G06F 9/46* (2006.01)
*G06F 13/00* (2006.01)
*G06F 9/445* (2006.01)
*G06F 13/10* (2006.01)

(56) References Cited

U.S. PATENT DOCUMENTS

| | | |
|---|---|---|
| 2010/0318778 A1 | 12/2010 | Jones |
| 2012/0254831 A1 | 10/2012 | Mortensen |
| 2012/0266148 A1 | 10/2012 | Mortensen |
| 2013/0124843 A1 | 5/2013 | Bobzin |
| 2016/0154657 A1* | 6/2016 | Lee .................... G06F 8/54 717/164 |

OTHER PUBLICATIONS

PCT Search Report/Written Opinion—Application No. PCT/US2013/045962 dated Mar. 31, 2014—9 pages.
"Adapter pattern"—Wikipedia, Retrieved form the Internet: https://en.wikipedia.org/wiki/Adapter_pattern, Dated Jun. 12, 2016, 7 pages.
"C (programming language)"—Wikipedia, Retrieved from the Internet: https://en.wikipedia.org/wiki/C_(programming_language), Dated Jul. 12, 2016, 18 pages.
"Wrapper function"—Wikipedia, Retrieved from the Internet: https://en.wikipedia.org/wiki/Wrapper_function, Dated Jun. 12, 2016, 3 pages.
Costanich, Bryan. "Using Objective-C Libraries and Code." Developing C# Apps for iPhone and iPad Using MonoTouch. Apress, 2011. 433-462.
"Driver Writer's Guide for UEFI 2.3.1—Version 1.01", Aug. 3, 2012, Retrieved from the internet: https://github.com/tianocore/tianocore.github.io/wiki/UEFI-Driver-Writer's-Guide.
"Remote Procedure Call"—Wikipedia, Retrieved from the Internet: https://en.wikipedia.org/wiki/Remote_procedure_call, Dated Jul. 12, 2016, 4 pages.
"Wrapper library"—Wikipedia, Retrieved from the Internet: https://en.wikipedia.org/wiki/Wrapper_library, Dated Jun. 12, 2016, 3 pages.

* cited by examiner

UNIFIED EXTENSIBLE FIRMWARE INTERFACE (UEFI) DRIVER AND PROTOCOL

BACKGROUND

The Basic Input/Output System (BIOS) is a firmware interface that may offer a limited environment in terms of software infrastructure available to interface with personal computers and other computing devices. With the adoption of the Unified Extensible Firmware Interface (UEFI) standard to replace or supplement BIOS, new opportunities for software-based differentiation at the firmware level have appeared.

BRIEF DESCRIPTION OF THE DRAWINGS

For a more complete understanding of various examples, reference is now made to the following description taken in connection with the accompanying drawings in which.

DETAILED DESCRIPTION

Figure 1:
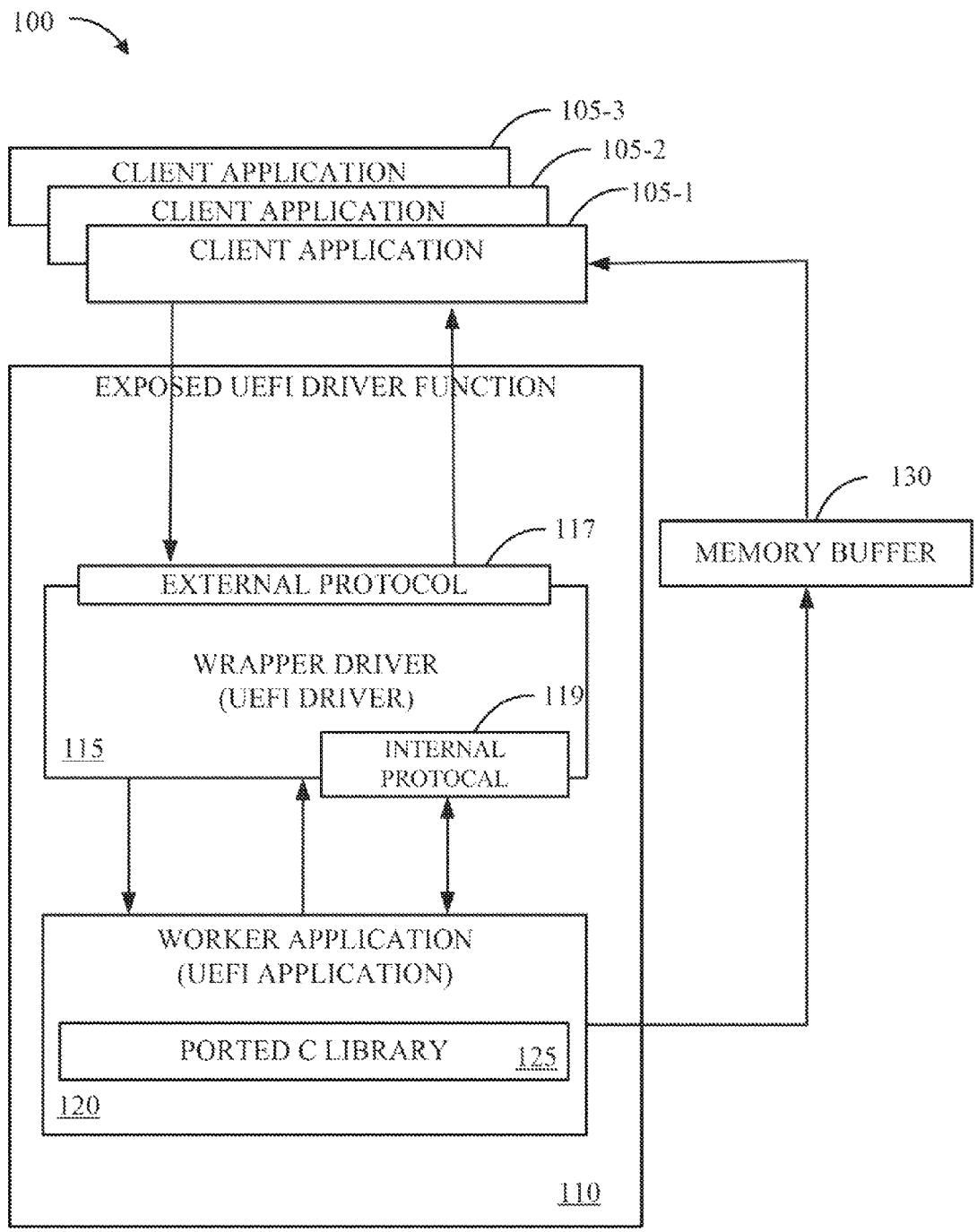
FIG. 1 illustrates an example execution flow for utilizing C-library functions in a UEFI environment.

The Unified Extensible Firmware Interface (UEFI) standard may provide a framework to improve upon the BIOS environment by adding flexibility for development of new applications and drivers. However, the software infrastructure (e.g., libraries and tools) available at system boot may be relatively poor with current UEFI environments compared with other development environments.

UEFI is a specification that defines a software interface between an operating system and platform firmware and hardware. UEFI may replace the Basic Input/Output System (BIOS) firmware interface used in older personal computer (PC) models. While BIOS is implemented as a piece of firmware, UEFI may include a programmable software interface that sits on top of a computer's firmware (including, for example, a UEFI-based BIOS-like firmware that may perform similar functions (e.g., pre-boot or bootstrapping functions) as a "legacy" BIOS) and hardware.

UEFI may provide a device driver environment referred to as EFI Byte Code, or EBC. System firmware may include an interpreter for any EBC images that reside in or are loaded into the EBC environment. EBC is but one possible target binary format that UEFI modules may be compiled into. UEFI drivers, for example, may be compiled into a format that is not EBC. UEFI drivers can provide support for hardware components and perform tasks for client applications. UEFI may define a shell environment capable of running UEFI applications. The shell environment typically serves as a development/diagnostic/support environment. In contrast, a UEFI BIOS may have, potentially, many UEFI applications to perform various user configurable tasks, e.g. to configure PC settings like the boot device preference, etc. UEFI may define protocols which are a set of software interfaces used for communication between two binary modules (e.g., drivers or client applications). UEFI drivers may provide services to other drivers and applications via protocols. Protocols may be produced by UEFI drivers and may be consumed by other UEFI drivers and any type of UEFI application.

The implementation of more robust features in UEFI may require a programmer to fully develop or adapt libraries, applications and/or drivers to comply with the programming model and application programming interfaces (APIs) of UEFI, which, although C-based, may not be compliant with existing C standards (e.g. ANSI C, C99, etc.). To bridge part of this gap, a port of a standard C library as per the C95 specification, and additionally a port of the Berkeley Software Distribution (BSD) sockets library and some Portable Operating System Interface (POSIX) functions, may be included in the open-source UEFI Development Kit (a.k.a. TianoCore) as part of an "UEFI Application Development Kit" (EADK).

Another challenge in firmware development may be keeping the size of the firmware binary image small due to storage space constraints on the platform (e.g., small flash/ROM parts). In some C development environments, the use of dynamically linked (or shared) libraries (DLLs) is a common approach to solve this problem. With this approach, only one copy of the library binary may be installed in the target environment, regardless of the number of applications that use the library (thus taking up only as many bytes as the library binary size). In the UEFI environment, dynamically linking may be achieved by the use of UEFI drivers, where the UEFI drivers may implement the library to be consumed (e.g., linked) by a UEFI application or other UEFI drivers, and may expose it through one or more UEFI protocol interfaces.

The use of the standard C libraries provided b the UEFI Application Development Kit may be restricted only to UEFI applications launched from the EFI shell (e.g., "hosted implementation"). UEFI drivers, on the other hand, may not be able to directly leverage these C libraries. In various examples described herein, a user may be allowed to circumvent this limitation and port existing standards-based C libraries (including, for example, many existing libraries that rely on standard C APIs for network communication using sockets) over to the UEFI environment, including the ability to deploy a single copy of the C library as a UEFI driver.

FIG. 1 illustrates an example execution flow 100 for utilizing C-library functions in a UEFI environment in accordance with one example. The example execution flow 100 may include one or more client applications 105 (three client applications 105-1, 105-2 and 105-3 are illustrated in the example of FIG. 1) that may invoke one or more exposed UEFI driver functions 110. The client applications 105 may be linked to and invoke the UEFI driver function 110 via one or more external protocols 117 for communication to and from the UEFI driver function 110. The UEFI driver function 110 may include two components; a wrapper driver 115 and a worker application 120. The wrapper driver 115 can be implemented as a regular UEFI driver (e.g., providing load/unload capabilities, installing protocols, etc.). The worker application 120 can be implemented as a UEFI application. In various examples, the worker application 120 may contain the core functionality provided by the various functions ported from a standard C-based library 125, which can be statically linked with the worker application 120. The example execution flow 100 may employ a technique that allows the worker application 120 to be embedded in and loaded from within the binary image of the wrapper driver 115, thereby allowing both the wrapper driver 115 and the worker application 120 to be bundled into a single binary image.

In various examples of the execution flow 100, the wrapper driver 115 may hide the worker application 120 and may simply expose interfaces to the worker application 120, including whatever features are implemented in the worker application 120, through one or more external protocols 117. The features exposed via the external protocol 117 are, in turn, connected by the wrapper diver with the worker application through one or more internal protocols 119, to command the worker application to perform the actual work. In various examples, the wrapper driver 115 may delegate work to the worker application 120. As discussed above, a protocol may be essentially a block of function pointers and data structures (APIs) published by a UEFI driver to be consumed by other system components (e.g., akin to the published API of a DLL or shared library). By implementing the core functionality in the worker application 120 and invoking the C library features via the internal protocol 119, the example execution flow 100 may be able to circumvent the technical limitations that may prevent the building of a UEFI driver that links directly with the Standard C library provided by the UEFI Development Kit (EADK).

In various examples, the worker application 120 may be stored within the code for the wrapper driver 115. In this regard, each time the worker application 120 is loaded, it may be accessed from a fixed location in a memory. Thus, the need to look through driver files in the ROM or to load the worker application from the ROM to the RAM may be reduced or eliminated.

In various examples, the worker application 120 may execute operations on behalf of the wrapper driver 115. To do this, in some examples, the wrapper driver 115 may load and start the worker application 120 upon being called by an external protocol 117; upon being started, the worker application may query the driver using the internal protocol (referred to herein as a GetOperation) to determine what operation is to be executed by the worker application 120. Subsequent to performing the GetOperation query, the worker application may call the corresponding function(s) in the ported C library 125 with the parameters provided by the wrapper driver 115. In some examples, subsequent to performing the specified operations, the worker application 120 may store any results in a memory buffer 130 and may then exit, returning control to the wrapper driver 115 which may then, upon completion of the task requested by one of the client applications 105, return control to the client application 105. The client application can then retrieve the results from the memory buffer 130. In this way, for each call made by a client application 105 to external APIs exposed through the wrapper driver 115, the worker application 120 may get loaded into memory, executed and unloaded.

Figure 2:
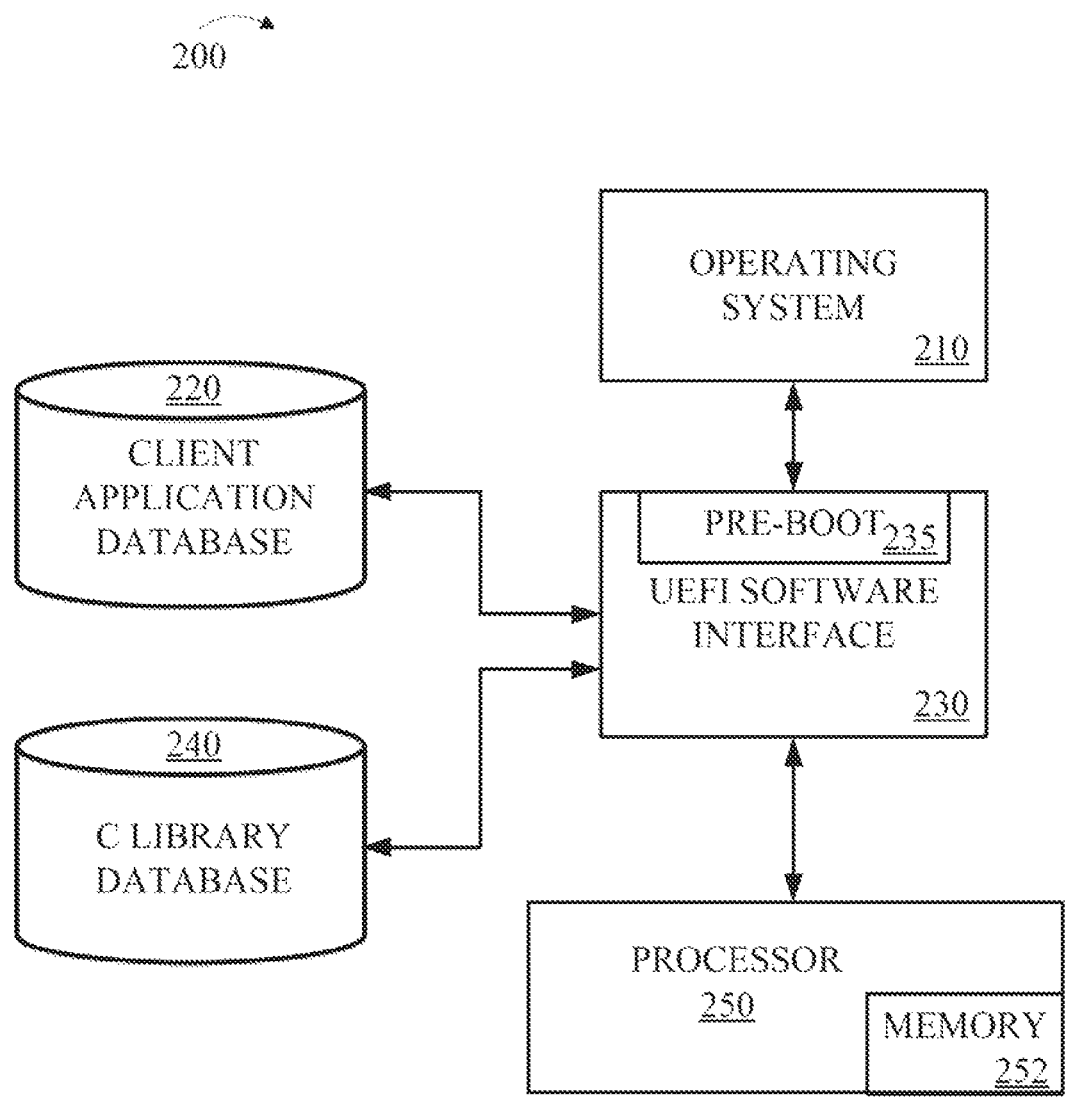
FIG. 2 illustrates an example system.

Referring now to FIG. 2, an example system 200 is illustrated. The example system 200 of FIG. 2 may implement the execution flow 100 of FIG. 1, for example. The example system 200 may include an operating system 210 coupled to a UEFI software interface 230 which may be coupled to a processor 250. The example processor 250 may be any processor, such as a chip or chipset, that may handle electronic instructions. In various examples, the processor 250 may have a non-transitory memory device 252. The example memory device 252 may include any of as variety of types of storage devices, such as flash memory, hard disk, or other such storage device. In various examples, the memory device 252 may be integrally formed with the processor 250 or may be an external memory device. The memory device 252 may include program code that may be executed by the processor. For example, one or more processes may be performed to execute client applications 105 as described above with reference to FIG. 1.

In various examples, the UEFI software interface 230 may include a pre-boot module 235 that provides a UEFI pre-boot environment. The pre-boot environment allows UEFI applications (and drivers) to be executed as part of a system bootstrap sequence, which may include the automatic loading of a pre-defined set of UEFI modules (drivers and applications). As an alternative to automatic loading, the bootstrap sequence, or a portion thereof, could be triggered by user intervention (e.g. by pressing a key on the keyboard) before the operating system 210 boots. The list of modules to be loaded may, in various examples, be hard-coded into system ROM. For example, a BIOS setup menu user interface may be one such application.

The example system 200 may further include a client application database 220 which may store computer program code for the client applications 105-1, 105-2 and 105-3 of the example of FIG. 1. The client applications 105 in the client application database can invoke UEFI drivers implemented by the UEFI software interface 230. The client applications 105 may include applications used during the bootstrap sequence that is invoked by the pre-boot module 235. In various examples, the UEFI drivers can include wrapper drivers, such as the wrapper driver 115 described above, that can invoke worker applications such as the worker application 120 described above. The wrapper drivers and worker applications can be stored in the client application database 220.

The UEFI software interface 230 may be in communication with a C library database 340 that stores a standard C library such as the standard C library provided by the UEFI Application Development Kit. The worker applications 120 can dynamically link to various functions in the C library database 240 in response to performing the GetOperation query with one of the wrapper drivers 115 via the internal protocol 119 as described above.

Figure 3:
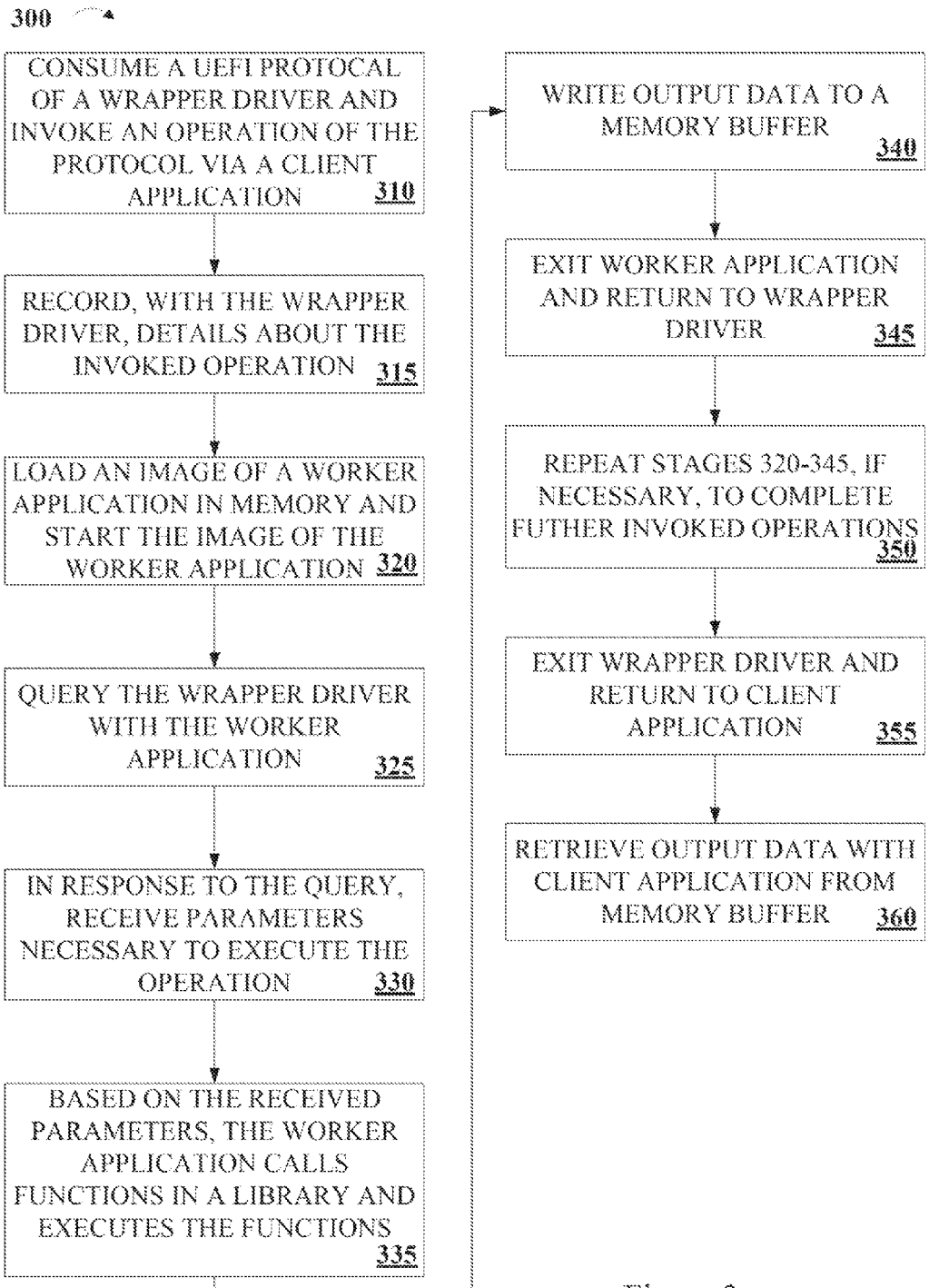
FIG. 3 illustrates an example process for utilizing C-library functions in a UEFI environment.

FIG. 3 illustrates an example process 300 for utilizing C library functions in a UEFI environment, for example, as described above with reference to FIG. 1. In various examples, the process 300 may be perforated, at least in part, by the example system 200 of FIG. 2. The process 300 will be described in further reference to FIGS. 1 and 2.

In the example illustrated in FIG. 3, the process 300 may begin with one of the client applications 105 being initiated by the processor 250, for example, in conjunction with the the UEFI software interface 230 and the pre-boot module 235. The client application 105 can be stored in the client application database 220. The client application 105 may be written such that it consumes a UEFI protocol (e.g., the external protocol 117 in FIG. 1) produced by the wrapper driver 115 and may invoke an operation of the UEFI protocol (block 310). The processor 250 may initiate execution of the wrapper driver 115 in order to invoke the operation of the consumed protocol.

Upon being initiated, the wrapper driver 115 may cause the processor 250 to record details about the invoked operation (block 315). The details can be recorded internally in the memory device 252, for example. In various examples, the recorded details can include which functions are to be executed, which input parameters are to be used and which output data is to be returned after execution of the invoked operations.

At block 320, the wrapper driver 115 may cause the processor 250 to load a binary image of the worker application 120 into the memory 252. In various examples, the image of the worker application 120 can be loaded using the LoadImage system service function of the UEFI interface 230. The processor 250 may then start execution of the binary image of the worker application 120. This can be accomplished using the StartImage system service function of the UEFI interface 230. Starting execution of the worker application 120 may block the client application 105 from calling into the wrapper driver 115 until the worker application 120 executes, exits and returns to the wrapper driver 115.

Upon being initiated b the wrapper driver 115 at block 320, the worker application 120 may query the wrapper driver 115 using the internal protocol 119 which provides the GetOperation API described above (block 325). In the example of FIG. 3, at block 330, in response to the query, the wrapper driver 115 may return the parameters necessary to execute the operation which was recorded by the wrapper driver 115 at stage 315. In various examples, the worker application 120 may receive the parameters (block 330).

In various examples, the worker application 120 may execute one or more ported functions from the C library database 240 based on the parameters received from the wrapper driver 115 at block 330 (block 335). Upon receiving the functions, the worker application 120 may cause the processor 250 to execute the ported functions using input parameters obtained at block 330.

In the example of FIG. 3, at block 340, after completing execution of the ported C functions, the worker application 120 may write output data to the memory butler 130. In some examples, in C libraries, data may be returned to the caller through an output pointer, for example. This is fully supported by the UEFI interface 230, taking advantage of the fact that there is no process/memory isolation in UEFI while boot services are available. Despite the fact that the client application 105, the wrapper driver 115 and the worker application 120 are all independent executable binary images, the underlying functions from the C library database may be able to write to memory addresses handed down by the upper layers (e.g., the client applications 105 and/or the wrapper driver 115).

At block 345 of the example process of FIG. 1, the worker application 120 may exit execution, and control may be returned, via the StartImage system service function, to the wrapper driver 115. At block 350, if other operations need to be invoked to complete the details recorded at block 315, the processes of blocks 320-345 may be repeated until all operations are completed. Upon completing all the operations, the wrapper driver 115 may be exited, and control may be returned to the client application 105 (block 355). At block 360, the client application 105 can retrieve the output data stored by the worker application 120 in the memory buffer 130 at a specified buffer address, for example.

The process 300 illustrated in FIG. 3 is an example only and not limiting. In various examples, the process 300 may be altered, for example, by having steps or blocks added, removed, rearranged, combined, and/or performed concurrently. For example, in some examples, block 360, where the client application 105 may retrieve the output data from the memory buffer 130, may be performed before blocks 320-345 are repeated (see block 350) to perform other operations invoked by the client application at stage 310. Still other alterations to the process 300 as shown and described are possible and are contemplated within the scope of the present disclosure.

One potential benefit of the methods and systems described above is the reduced development time and consequently time to market, and increased quality of UEFI-based firmware features, allowing for the reuse of existing, proven C-based applications/libraries in the UEFI environment.

Various examples described herein are described in the general context of method steps or processes, which may be implemented in one example by a software program product or component, embodied in a machine-readable medium, including executable instructions, such as program code, executed by entities in networked environments. Generally, program modules may include routines, programs, objects, components, data structures, etc. which may be designed to perform particular tasks or implement particular abstract data types. Executable instructions, associated data structures, and program modules represent examples of program code for executing steps of the methods disclosed herein. The particular sequence of such executable instructions or associated data structures represents examples of corresponding acts for implementing the functions described in such steps or processes.

Software implementations of various examples can be accomplished with standard programming techniques with rule-based logic and other logic to accomplish various database searching steps or processes, correlation steps or processes, comparison steps or processes and decision steps or processes.

The foregoing description of various examples has been presented for purposes of illustration and description. The foregoing description is not intended to be exhaustive or limiting to the examples disclosed, and modifications and variations are possible in light of the above teachings or may be acquired from practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, modules, systems, and computer program products.

It is also noted herein that while the above describes examples, these descriptions should not be viewed in a limiting sense. Rather, there are several variations and modifications which may be made without departing from the scope as defined in the appended claims.

What is claimed is:

1. An apparatus, comprising:
a processor; and
a memory device including computer program code, the memory device and the computer program code, with the processor, to cause the apparatus to:
execute a client application, the client application to consume a first protocol, the protocol having been produced by a Unified Extensible Firmware interface (UEFI) wrapper driver;
invoke, with the client application, the UEFI wrapper driver to perform at least one operation of the protocol;
load a binary image of a worker application with the wrapper driver to invoke the at least one operation, wherein the worker application calls at least one function of a software library to perform the at least one operation.

2. The apparatus of claim 1, wherein the computer program code further causes the worker application to query the UEFI wrapper driver via a second protocol produced by the UEFI wrapper driver and receive parameters from the UEFI wrapper driver, the parameters being used to perform the at least one operation with the at least one function.

3. The apparatus of claim 2, wherein the computer program code further causes the at least one function to perform the at least one operation based on the parameters.

4. The apparatus of claim 1, wherein the computer program code further causes the worker application to write output data to a memory buffer, the output data resulting from the at least one operation.

5. The apparatus of claim 4, wherein the computer program code further causes the client application to retrieve the output data from the memory buffer.

6. A method, comprising:
receiving an invocation at a Unified Extensible Firmware Interface (UEFI) wrapper driver via a first protocol produced by the UEFI wrapper driver, the invocation indicating to perform at least one operation;
loading a binary image of a worker application;
receiving a query from the binary image of the worker application via a second protocol produced by the UEFI wrapper driver;
in response to the query, sending parameters needed to perform the at least one operation from the UEFI wrapper driver to the worker application, and
calling, with the worker application, at least one function of a software library to perform the at least one operation based on the parameters,
wherein, the UEFI wrapper driver, the worker application and the at least one function are executed on a processor.

7. The method of claim 6, further comprising:
executing the at least one function to perform the at least one operation.

8. The method of claim 6, wherein the at least one function is a C program.

9. The method of claim 6, further comprising:
writing, with the worker application, output data to a memory buffer subsequent to the at least one function performing the at least one operation.

10. The method of claim 9, wherein the invocation is received from a client application consuming the first protocol, the method further comprising:
retrieving, with the client application, the output data from the memory buffer.

11. A computer program product, embodied on a non-transitory computer-readable medium, comprising:
computer code to execute a Unified Extensible Firmware Interface (UEFI) wrapper driver, the UEFI wrapper driver producing a first protocol and a second protocol
computer code to execute a client application, the client application consuming the first protocol to invoke at least one operation of the first protocol,
computer code to load a binary image of a worker application with the UEFI wrapper driver in response to the at least one operation being invoked; and
computer code to execute the worker application, the worker application calling at least one function of a software library to perform the at least one operation.

12. The computer program product of claim 11, wherein the computer code to execute the worker application causes the worker application to query the UEFI wrapper driver application via the second protocol for parameters needed to perform the at least one operation.

13. The computer program product of claim 12, wherein the computer code to execute the UEFI wrapper driver causes the UEFI wrapper driver to record details about the at least one operation in a memory and send at least a portion of the details to the worker application in response to the query.

14. The computer program product of claim 11, wherein, upon the at least one called function performing the at least one operation, the worker application is exited and control returns to the UEFI wrapper driver, and the computer code to execute the UEFI wrapper driver further causes the UEFI wrapper driver to load another binary image of the worker application to perform another invoked operation.

15. The computer program product of claim 14, wherein computer code to execute the worker application causes the another binary image of the worker application to call another function of the software library to perform the another invoked operation.

* * * * *